UNITED STATES PATENT OFFICE.

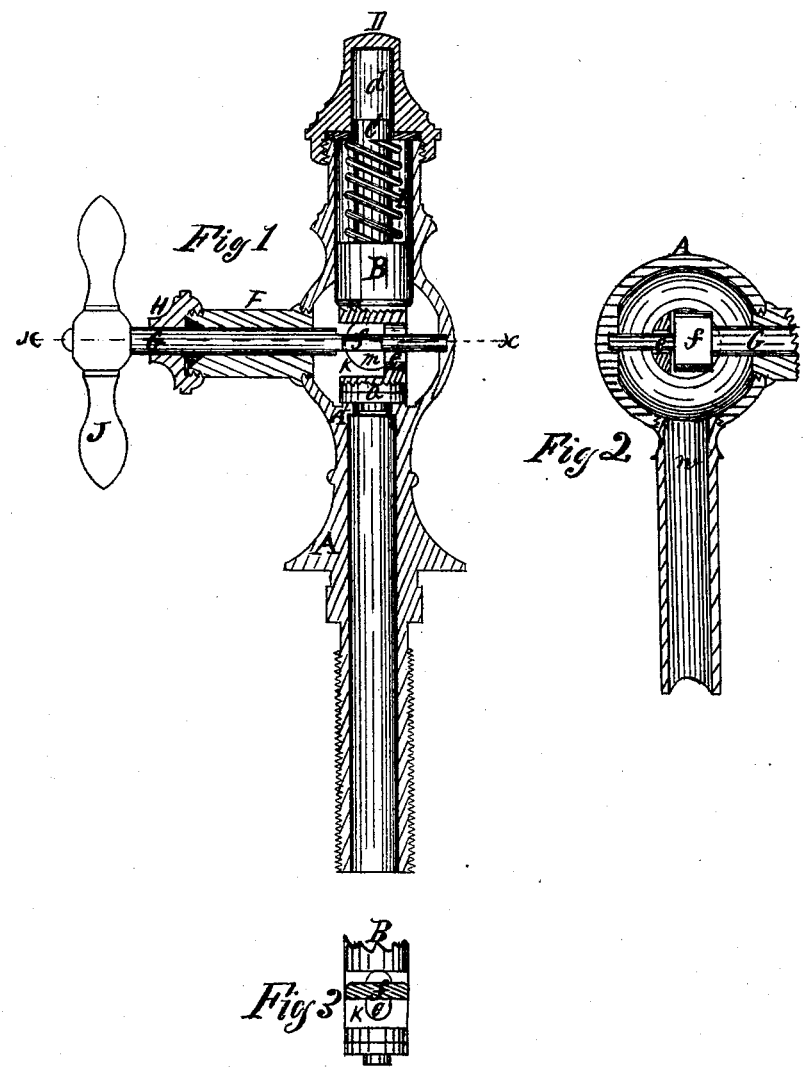

JOHN GREEN, OF CHICAGO, ILLINOIS.

IMPROVEMENT IN FAUCETS.

Specification forming part of Letters Patent No. 149,471, dated April 7, 1874; application filed December 11, 1872.

*To all whom it may concern:*

Be it known that I, JOHN GREEN, of Chicago, in the county of Cook and State of Illinois, have invented a new and useful Improvement in Faucets; and I do hereby declare the following to be a full, clear, and exact description thereof, which will enable others skilled in the art to which my invention appertains to make and use the same, reference being had to the accompanying drawing forming part of this specification, in which—

Figure 1 is a vertical central section of my said improvement. Fig. 2 is a cross-section or plan taken on the line $x\ x$, drawn across Fig. 1; and Fig. 3 is an elevation of the lower portion of the valve, showing a cross-section of the cam acting to lift the valve.

Similar letters of reference indicate like parts in the several figures of the drawing.

The present invention has for its object to provide a self-closing faucet for hydrants, barrels, and for other like purposes; and to that end the improvement consists in the combination of a valve and spring, arranged upon the valve-stem, with a rock-shaft passing through the body of the valve, and supported in bearings on opposite sides of the valves, and provided on alternate sides with a cam adapted to move within a mortise formed in the body of the valve, whereby the latter is raised by a rocking movement of the shaft, all of which will be more fully understood by the following description.

In the accompanying drawing, A represents the barrel of the faucet, which may be as shown, or may be in any suitable form that will receive the operating parts. A' is the valve-seat, which is formed within the barrel, as shown in Fig. 1. B is the valve, the lower extremity of which is provided with suitable packing, $a$, which bears upon the valve-seat in the usual manner. C is the valve-stem, which is firmly attached to or made as a part of the valve, and extends upward slightly above the upper extremity of the body of the faucet. D is the cap, which is screw-threaded internally, and adapted to closely fit upon the upper extremity of the barrel. This cap is provided with an aperture, $d$, into which the upper portion of the valve-stem passes when the valve is raised. The walls of this aperture are so shaped as to closely fit the stem C of the valve, by which means the latter is prevented from casually rocking when made to ascend or descend, which insures a positive movement of the valve, causing the same to rest evenly on its seat when depressed. E is a coiled spring, which is loosely fitted upon and around the valve-stem, between the upper extremity of the valve and lower surface of the cap. The elasticity of this spring is such as to firmly hold the valve upon its seat, thereby securing a water-tight joint. F is a cylinder, which is secured to the barrel at a point slightly below the center of the valve, as shown in Fig. 1. Within this cylinder is loosely fitted a rock-shaft, G, which extends transversely across or through the chamber of the barrel. The outer end of this cylinder is screw-threaded externally, and upon which is secured a stuffing-box, H, through which the rock-shaft passes. This stuffing-box is so arranged as to secure a water-tight joint around the shaft. Firmly secured to the outer end of the rock-shaft is a lever, J, by which the proper motion is imparted to the shaft. The lower portion of the valve is provided with a slot or niche, K, formed across the same, as shown in Figs. 1 and 3. A mortise, $e$, is formed in the valve, and at a right angle to the side of the niche, through which the rock-shaft passes. This mortise is so arranged as to admit of a slight upward movement of the valve. The said rock-shaft is provided with a cam, $f$, which extends across the nitch slightly below the upper shoulder of the niche. This cam is so arranged that as an alternate rocking movement is imparted to the shaft the cam is brought in contact with and against the upper shoulder of the niche, by which means the valve is raised from its seat, and the water passes under the valve into the chamber of the barrel, and is discharged therefrom through the spout $m$; and as power is removed from the lever of the shaft, the elasticity of spring E forces the cam back to its normal position and the valve upon its seat, thereby closing the same. The rock-shaft G extends through the body of the valve and across the water-space in the barrel, and is provided with an axle, $e$, passing into a corresponding recess formed in the walls of the barrel. By this arrangement the shaft is held in position so as to give a positive upward movement to the valve, when a rocking movement is imparted to the shaft.

Having thus described my invention, I claim—

The combination of the barrel A, valve B, spring E, and cap D, provided with aperture d, adapted to guide-stem C of the valve, with cylinder F, stuffing-box H, and rock-shaft G, provided with cam f, adapted to move within niche K of the valve, and supported by bearings at both sides of the valve, all constructed and arranged to operate substantially in the manner specified.

The above specification of my invention signed by me this 2d day of December, 1872.

JOHN GREEN.

Witnesses:
N. H. SHERBURNE,
J. W. MERRIAM.